United States Patent
Kono (10) Patent No.: US 6,298,830 B1
(45) Date of Patent: Oct. 9, 2001

(54) METHOD OF JETTING HIGH-PRESSURE FUEL AND APPARATUS THEREFOR

(75) Inventor: Hiromi Kono, Higashimatsuyama (JP)

(73) Assignee: Zexel Corporation, Tokyo (JP)

( * ) Notice: Subject to any disclaimer, the term of this patent is extended or adjusted under 35 U.S.C. 154(b) by 0 days.

(21) Appl. No.: 09/555,014

(22) PCT Filed: Nov. 27, 1998

(86) PCT No.: PCT/JP98/05332

§ 371 Date: May 23, 2000

§ 102(e) Date: May 23, 2000

(87) PCT Pub. No.: WO99/28610

PCT Pub. Date: Jun. 10, 1999

(30) Foreign Application Priority Data

Nov. 28, 1997 (JP) .................................................. 9-341863

(51) Int. Cl.[7] .................................................. F02M 51/00
(52) U.S. Cl. .................... 123/478; 123/490; 701/104; 701/105
(58) Field of Search .................... 123/478, 490, 123/305; 701/104, 165

(56) References Cited

U.S. PATENT DOCUMENTS

| 4,603,669 | * | 8/1986 | Takemoto et al. | 123/490 |
| 5,535,621 | * | 7/1996 | Glidewell et al. | 123/478 |
| 5,617,337 | * | 4/1997 | Eidler et al. | 123/478 |
| 6,155,242 | * | 12/2000 | Kotwicki et al. | 701/104 |
| 6,170,459 | * | 1/2001 | Ono et al. | 123/305 |

FOREIGN PATENT DOCUMENTS 7-269394  7/1995  (JP) .

* cited by examiner

*Primary Examiner*—Erick Solis
(74) *Attorney, Agent, or Firm*—Connolly Bove Lodge & Hutz, LLP (57) ABSTRACT

In order to obtain an amount of fuel injection determined by a target fuel injection amount determining unit (51) from an injector (32) supplied with high-pressure fuel from a high-pressure pump (2), there is provided a reference injection period determining unit (52) responsive to a target fuel amount signal (Qt) for determining a reference injection period (Tr) and a correction amount calculating unit (53) responsive to the reference injection period (Tr) and the rotational speed (R) of a high-pressure pump (2) for calculating a correction amount (F) for correcting the error caused by decrease in fuel pressure during the period of fuel injection, whereby an actual injection period (Ta) is determined by correcting the reference injection period (Tr) by the correction value (F). As a result, the injection pulse width can be controlled so as to precisely supply the desired amount of fuel from the injector (32).

9 Claims, 5 Drawing Sheets

METHOD OF JETTING HIGH-PRESSURE FUEL AND APPARATUS THEREFOR

TECHNICAL FIELD

The present invention relates to a method and apparatus for injecting pressurized high-pressure fuel directly into the cylinders of an internal combustion engine.

BACKGROUND ART

In recent years, high-pressure fuel injection apparatuses capable of injecting high-pressure fuel directly into the cylinders of an internal combustion engine have been employed practically. In conventional high-pressure fuel injection apparatuses of this type, high-pressure fuel obtained by use of a high-pressure pump is accumulated in a common rail and the required amount of high-pressure fuel is directly injected from the common rail into the cylinders. The valve-open period of each injector is controlled by adjusting the pulse width of a drive pulse for driving the injector in accordance with a target amount of fuel injection determined on the basis of the operation condition of the engine at each instant. Consequently, it follows that the amount of fuel injected into the cylinder through an injector when opened is affected by the pressure of the fuel at that time.

To overcome this disadvantage, JP A Hei 7-269394 teaches an arrangement in which the pulse width of the drive pulse signal (injection pulse width) for determining the actual injection period of the injector needed at each instant is corrected in accordance with the actual pressure of the fuel supplied to the injector so as to obtain the desired amount of fuel injection regardless of variation in the pressure of fuel supplied.

The functional relationship established between the injection period of the injector and the amount of fuel injected through fuel pressure as a parameter is utilized in the known apparatus disclosed in JP A Hei 7-269394. This conventional apparatus is arranged in such a way that the fuel pressure at that time is measured prior to the fuel injection and the injection period of the injector is corrected by use of the functional relationship and the measured result, whereby the desired amount of fuel injection can be obtained regardless of variation in the pressure of fuel supplied.

When the arrangement described above is employed, the target amount of fuel injection can be reliably obtained in the case where the fuel pressure stays at the previously measured level during the period of fuel injection. However, the pressure of fuel accumulated in the common rail of an actual apparatus decreases when the fuel is injected from the injector. Therefore, according to the foregoing conventional technology in which the injection period of the fuel from the injector is determined on the basis of only the fuel pressure detected previously, the actual amount of fuel injected becomes less than the target amount of fuel injection and accurate fuel injection operation cannot be achieved.

It is an object of the present invention to provide a method and apparatus for injecting high-pressure fuel which is capable of overcoming the disadvantages mentioned above.

It is another object of the present invention to provide a method and apparatus which is capable of precisely and economically controlling the amount of fuel injected with consideration to decrease in fuel pressure caused by fuel injection.

DISCLOSURE OF THE INVENTION

The present invention is characterized in that variation in fuel pressure over the period when fuel is being injected from an injector is estimated and the injection period of the fuel injected from the injector is adjusted on the basis of the estimated result, whereby the desired amount of fuel can be precisely injected from the injector.

According to the present invention, in a high-pressure fuel injection apparatus comprising a high-pressure pump for pressurizing fuel to supply high-pressure fuel, a fuel injection section having a common rail for accumulating the high-pressure fuel therein and an injector (s) for supplying and injecting the high-pressure fuel accumulated in the common rail to an internal combustion engine, and a control section for controlling an actual injection period of the injector (s);

said control section comprises
  a first determining means responsive to at least one signal indicative of the operation condition of the internal combustion engine for determining a target amount of fuel injection per one period of fuel injection;
  a second determining means for determining a reference injection period of the injector in correspondence to the target amount of fuel injection determined by the first determining means;
  a calculating means responsive to the reference injection period and the rotational speed of the high-pressure pump for calculating a correction value for correcting the reference injection time so as to correct an error caused by decrease in fuel pressure during the period of fuel injection; and
  a correcting means for correcting the reference injection period by the correction value, whereby the actual injection period is controlled in response to the output from the correcting means.

The high-pressure pump may be a pump driven by an electric motor. The calculating means may be arranged in such a way that the correction value for the reference injection period is calculated from the engine speed and the target amount of fuel injection, instead of the rotational speed of the high-pressure pump.

According to the present invention, in a method for injecting high-pressure fuel, in which high-pressure fuel pressurized by means of a high-pressure pump is accumulated in a common rail and the high-pressure fuel accumulated in the common rail is injected directly into a cylinder of an internal combustion engine by open/close controlling a solenoid valve of an associated injector, the method comprises a first determining step for determining a target amount of fuel injection per one period of fuel injection, the target amount being matched to the operation condition of the internal combustion engine;
  a second determining step for determining a reference injection period indicating a valve-open-period of said solenoid valve for achieving the target amount of fuel injection;
  a calculating step for calculating a correction value for correcting the reference injection period so as to correct an error caused by decrease in fuel pressure during the period of fuel injection in response to the reference injection period and the rotational speed of the high-pressure pump;
  a step for correcting the reference injection period by the correction value to obtain an actual injection period during which the solenoid valve should be opened, whereby the solenoid valve is open/close controlled to open the solenoid valve for the actual injection time.

The correction value is calculated to become smaller as the rotational speed of the high-pressure pump increases.

This calculation may be performed by map calculation based on map calculation data indicating the relationship between the reference injection period and the correction value using the rotational speed of the high-pressure pump as a parameter.

The present invention is advantageous in that the amount of fuel injected can be precisely controlled to enable the engine to operate as desired, because the actual injection period is determined with consideration to decrease in fuel pressure caused by fuel injection from the injector. That is, the target torque is obtained since the amount of fuel injected does not change even if the engine speed varies.

Furthermore, since the precise control can be achieved simply by detecting the rotational speed of the high-pressure pump, increase in cost is small, so that an inexpensive and high-performance high-pressure fuel injection apparatus can be obtained. In the case where the correction value is determined by the use of the engine speed and the amount of fuel injected per one period of fuel injection, instead of the rotational speed of the high-pressure pump, the cost advantage is still greater because no detection of the rotational speed of the high-pressure pump is necessary.

BEST MODE FOR CARRYING OUT THE INVENTION

The present invention will be described in more detail with reference to the attached drawings.

Figure 1:
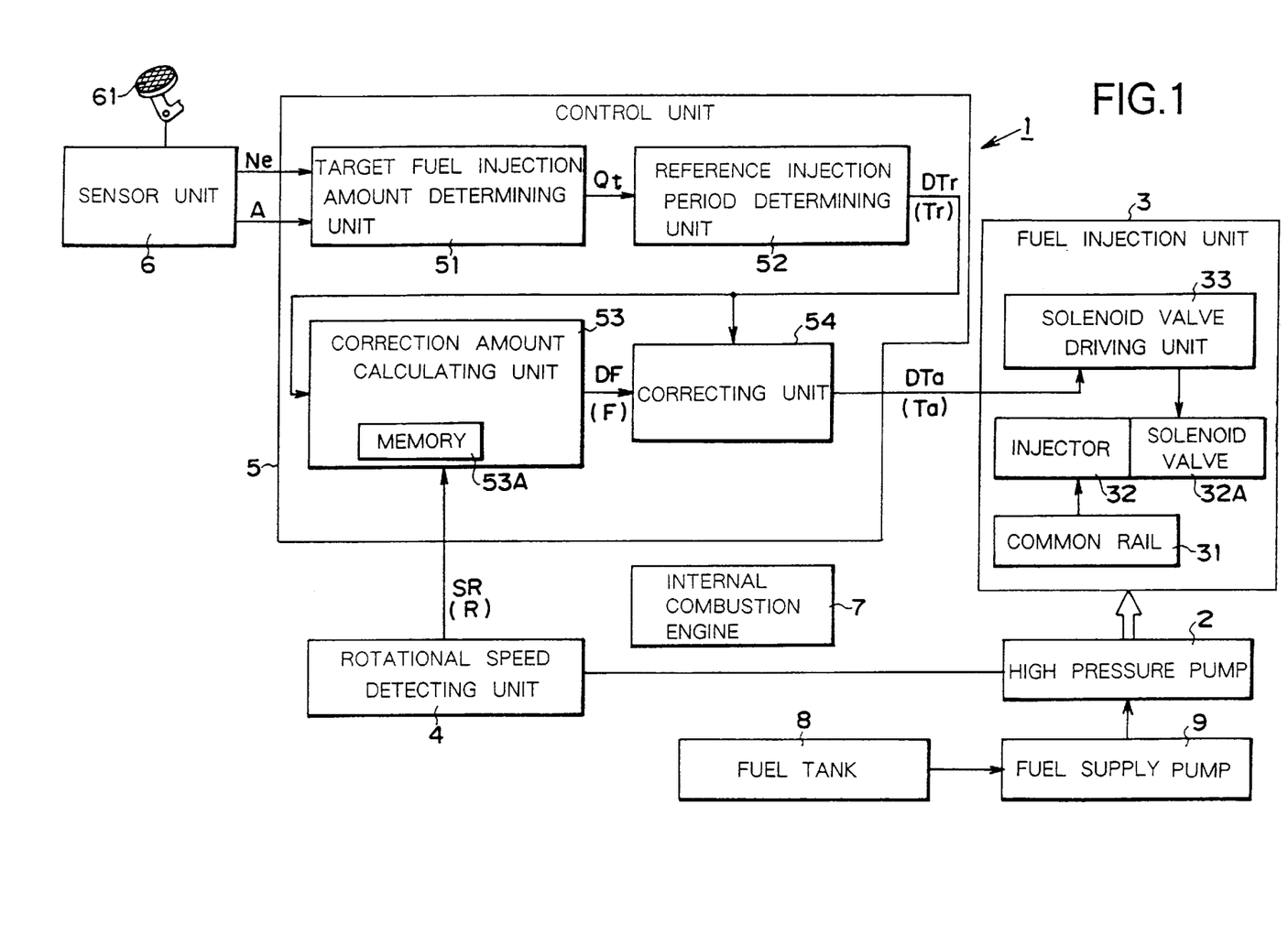
FIG. 1 is a block diagram of an embodiment of a high-pressure fuel injection apparatus according to the present invention.

FIG. 1 is a block diagram of an embodiment of a high-pressure fuel injection apparatus according to the present invention. The apparatus has a high-pressure fuel injection unit 1 for directly injecting and supplying high-pressure fuel into cylinders (not shown) of a vehicle internal combustion engine 7. The high-pressure fuel injection unit 1 is provided with a high-pressure pump 2 which is capable of pressurizing fuel supplied from a fuel tank 8 by means of a fuel supply pump 9 and a conventional fuel injection unit 3 for directly injecting the high-pressure fuel supplied from the high-pressure pump 2 into the cylinders (not shown) of the internal combustion engine 7.

The fuel injection unit 3 is provided with a common rail 31 for temporary accumulating the high-pressure fuel supplied from the high-pressure pump 2 and an injectors 32 for injecting the high-pressure fuel accumulated in the common rail 31 directly into the cylinders of the internal combustion engine 7. The fuel injection unit 3 is of known structure capable of injecting and supplying a desired amount of fuel at required timing into the necessary cylinder by on/off controlling solenoid valve 32A of the associated injector 32 in response to an electric signal supplied from the outside. In FIG. 1, only one injector 32 is illustrated for easier explanation. Actually, however, one injector 32 is provided for each cylinder of the internal combustion engine 7.

As stated above, although there is provided a plurality of injectors equal to the number of the cylinders of the internal combustion engine 7 in the fuel injection unit 3, only one of the injectors is shown in FIG. 1 and the description is given only to the driving control operation of the injector 32 in the following explanation. However, the driving of the injectors other than the injector 32 are also controlled in the same way as that described in the following.

Reference numeral 4 designates a rotational speed detecting unit for detecting the rotational speed of the high-pressure pump 2 and for outputting a rotational speed signal SR indicative of the rotational speed R of the high-pressure pump 2 at each instant. Reference numeral 5 indicates a control unit for controlling the actual injection period of the injector 32, that is, the actual fuel injection period (valve-open-period of the solenoid valve 32A of the injector 32) necessary for injecting and supplying the required amount of fuel from the injector 32 to the corresponding cylinder (not shown).

In order to inject the required amount of fuel accurately by estimating the change in fuel pressure during the time that fuel is injected from the injector 32 and adjusting the fuel injection period of the injector 32 on the basis of the estimated result, the control unit 5 comprises a target fuel injection amount determining unit 51 for determining a target amount Qt of fuel injected for each fuel injection on the basis of at least one signal indicating the operation condition of the internal combustion engine 7, a reference injection period, determining unit 52 for determining a reference injection period Tr of the injector 32 in correspondence to the target amount Qt of fuel injected determined by the target fuel injection amount determining unit 51, a correction amount calculating unit 53 for calculating a correction amount F for the reference injection period Tr from the reference injection period Tr and the rotational speed R of the high-pressure pump 2, and a correcting unit 54 for correcting the reference injection period Tr by the correction amount F, whereby the actual injection period is controlled in response to the output from the correcting unit 54.

Prior to the detailed description of the constitution of the control unit 5, description will be given regarding the manner of determining the pulse widths of the injector driving pulse signal for determining the injection period of the fuel from the injector 32 in the case where the rate of the decrease in fuel pressure is constant over the pulse width of the pulse signal for the fuel injection.

Assume that the injection amount Qpc from the injector is given by the following equation when the fuel pressure is constant:

$$Qpc = A\,Tp - B$$

wherein A and B are constants, and Tp is the injection pulse width, i.e., the pulse width of an injector drive pulse signal for determining the injection period of fuel from the injector 32.

In this case, the fuel pressure decreases owing to the fuel injection in the actual fuel system. Then assuming that C is the amount of fuel injection decrease caused by the decrease of the fuel pressure, the actual amount Qa of fuel injected can be expressed as follows:

$$Qa = A\,Tp - B - C.$$

Accordingly, the injection pulse width Tp can be expressed as follows:

$$Tp = (Q+B+C)/A$$

$$= Q/A + X + Y$$

wherein X=B/A, Y=C/A.

In general, the value of Q/A+X is used for obtaining the injection pulse width of the injector and if this term is replaced by Z, the injection pulse width Tp can be expressed as follows:

$$TP = Z + Y$$

Figure 2:
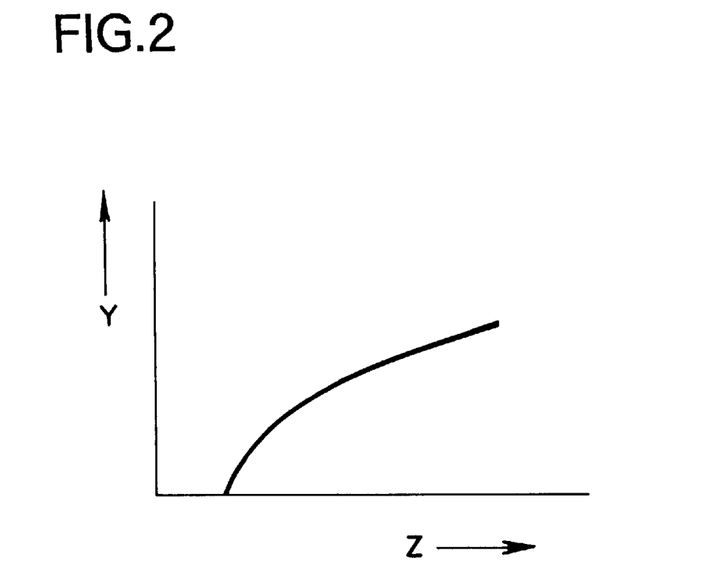
FIG. 2 is a graph illustrating a relationship between decrease in fuel injection amount owing to the lowering of fuel pressure caused by fuel injection from an injector and an injection pulse width.

In this case, since the relationship shown in FIG. 2 is established between Y and the injection pulse width Z, the value of Y can be obtained if the value of Z is given.

The injector 32 can be operated so as to accurately inject a desired amount of fuel if the pulse width of the driving pulse signal for the injector 32 is set by the value of Tp obtained as described in the foregoing.

The foregoing description is given to the case where the rate of fall in fuel pressure is constant during the fuel injection operation. Actually, however, the rate of fall in fuel pressure is not always constant.

Figure 3:
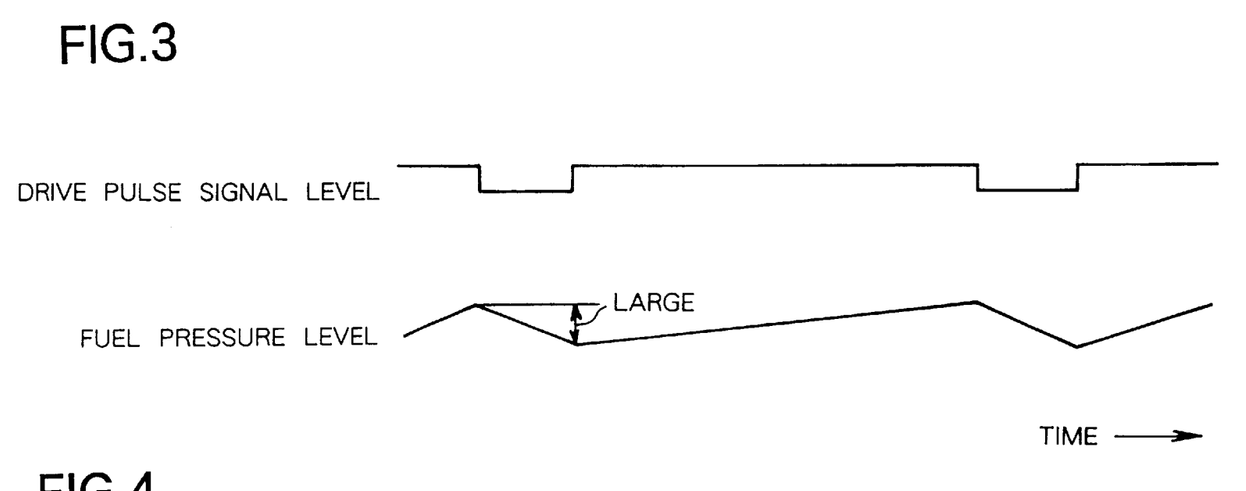
FIG. 3 is a graph for explaining how fuel pressure is affected by fuel injection in the case of relatively low engine speed.
Figure 4:
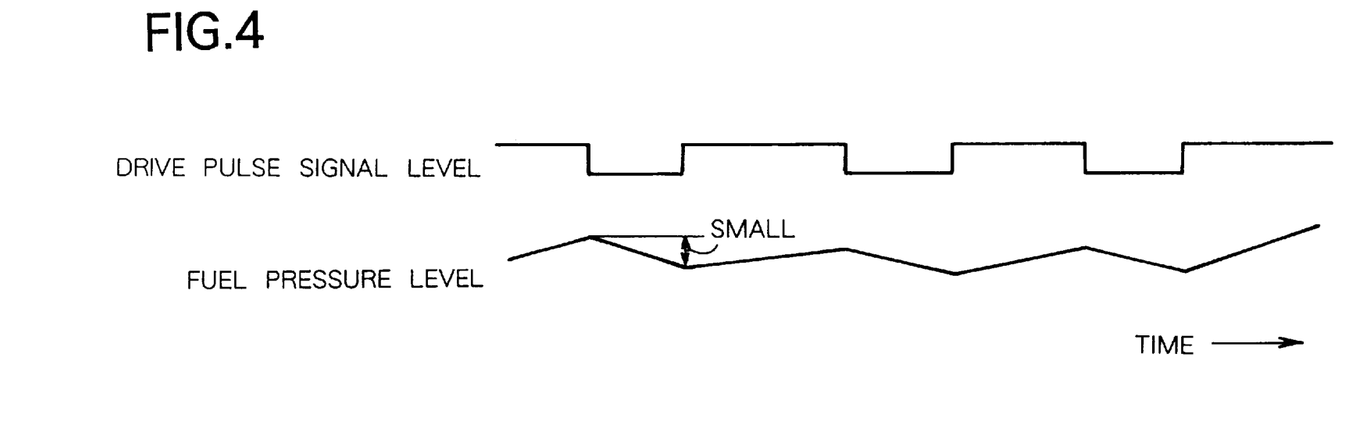
FIG. 4 is a graph for explaining how fuel pressure is affected by fuel injection in the case of relatively high engine speed.

FIGS. 3 and 4 are level diagrams for explaining variation of the fuel pressure supplied from the high-pressure pump 2 in the case where the engine speed is 1,000 rpm and 2,000 rpm, respectively. FIG. 3 illustrates the variation in the level of the drive pulse signal and the corresponding variation in the fuel pressure for the engine speed of 1,000 rpm. FIG. 4 illustrates the variation in the level of the drive pulse signal and the corresponding variation in the fuel pressure for the engine speed of 2,000 rpm.

The rotational speed of the high-pressure pump 2 depends upon the rotational speed of its electric motor (not shown). In this embodiment, the rotational speed of the high-pressure pump 2 is determined to be half of the engine speed for each case, that is, 500 rpm and 1,000 rpm. In the case where the amount of fuel injection is not changed, the amount of fuel consumption will be doubled when the engine speed is doubled. As a result, the amount of fuel supplied from the high-pressure pump 2 during a fuel injection operation will increase as the rotational speed of the high-pressure pump 2 becomes higher, and the decrease in fuel pressure during a fuel injection operation becomes less as the rotational speed of the high-pressure pump 2 becomes higher. Consequently, even more enhanced, extremely accurate fuel injection can be obtained by correcting the value of Y for the rotational speed of high-pressure pump 2.

The disadvantage of decrease in fuel pressure during the fuel injection operation always occurs when the high-pressure pump 2 is driven, and the desired amount of fuel can be accurately injected from the injector 32 if the valve-opening period of the solenoid valve 32A of the injector 32 is corrected in accordance with the rotational speed of the high-pressure pump 2. The present invention is based on this knowledge.

Figure 5:
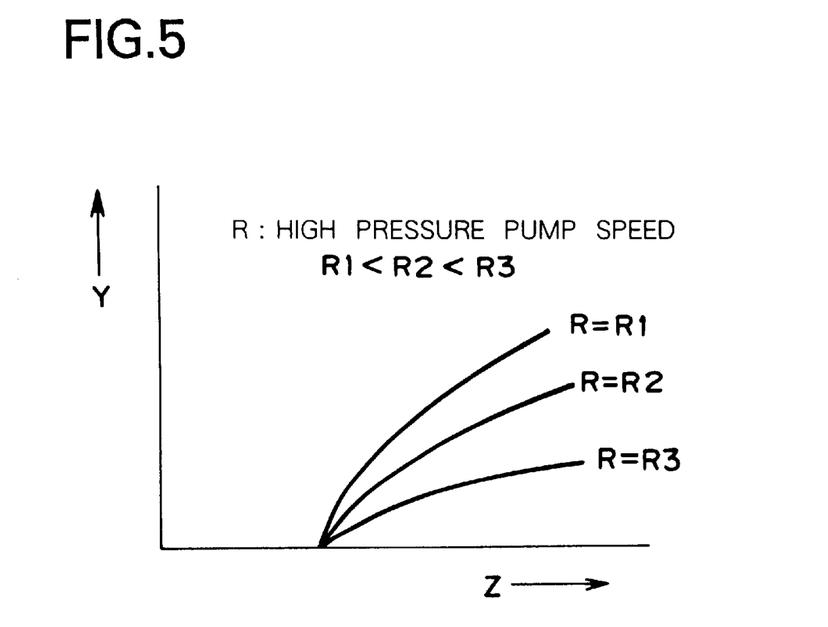
FIG. 5 is a graph illustrating a relationship between decrease in fuel injection amount owing to the lowering of fuel pressure caused by fuel injection from an injector and an injection pulse width, in which the rotational speed of a high-pressure pump is used as a parameter.

Specifically, as illustrated in FIG. 5, in the high-pressure fuel injection apparatus 1 the correction amount Y becomes less as the rotational speed of the high-pressure pump 2 becomes higher since the decrease in fuel pressure during a fuel injection operation becomes less as the rotational speed of the high-pressure pump 2 becomes higher.

Instead of changing the value of Y on the basis of the rotational speed of the high-pressure pump 2, the value of Y may be determined on the basis of the amount of fuel injected per unit time or the product of the engine speed and the amount of fuel injected per one injection.

Referring again to FIG. 1, values of different parameters indicating the operation condition of the internal combustion engine 7 at each instant are input to the control unit 5 from the sensor unit 6. In this embodiment, an engine speed signal Ne indicating the engine speed of the internal combustion engine 7 and an acceleration signal A indicating the operation amount of an accelerator pedal 61 are output from the sensor unit 6 to the target fuel injection amount determining unit 51 of the control unit 5. The target fuel injection amount determining unit 51 is responsive to the engine speed signal Ne and the acceleration signal A to determine a target amount of fuel injection optimum for the operation condition of the internal combustion engine 7 at each instant. The target fuel injection amount signal Qt indicative of the target amount of fuel injection determined by the target fuel injection amount determining unit 51 is input to the reference injection period determining unit 52.

Figure 6:
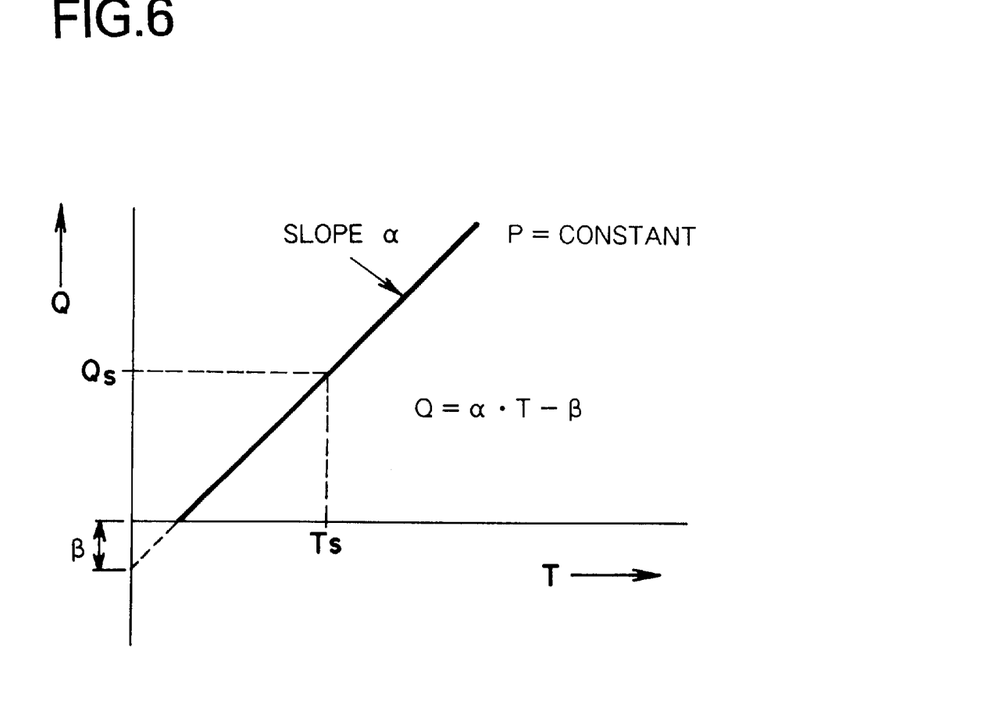
FIG. 6 is a graph showing a relationship between an injection pulse width and an amount of fuel injected.

The target fuel injection period Tr is determined by the reference injection period determining unit 52 on the basis of the target fuel injection amount signal Qt. The reference injection period Tr is determined as follows:

As illustrated in FIG. 6, the characteristics of the injector 32 showing the relationship between the injection pulse width T and the amount Q of fuel injected at that time is represented by the straight line with a slope α and an intercept β. According to FIG. 6, the valve Ts of the injection pulse width T necessary for obtaining the target fuel injection amount Qs determined by the target fuel injection amount determining unit 51 can be shown as follows:

$$Ts = Qs/\alpha + \beta/\alpha$$

$$= Qs/\alpha + M \quad (M=\beta/\alpha)$$

The reference injection period determining unit 52 carries out the calculation for obtaining a reference fuel injection period Ts, which represents a provisional injection period necessary for obtaining the target fuel injection amount indicated by the target fuel injection amount signal Qt, and the calculated result is determined as a reference injection period (provisional injection pulse width) Tr. This determination may be carried out by map calculation from map data based on the characteristic data or an actual measured value of the injector 32.

The reference injection period data DTr, which is obtained in the manner mentioned above and is indicative of the reference injection period Tr, is input to the correction amount calculating unit 53 to which the rotational speed signal SR is sent. The correction amount calculating unit 53 is responsive to the reference injection period Tr according to the reference injection period data DTr and the rotational speed R according to the rotational speed signal SR, to carry out the calculation for determining the injection period correction amount F which is used for correcting the reference injection period Tr.

Figure 7:
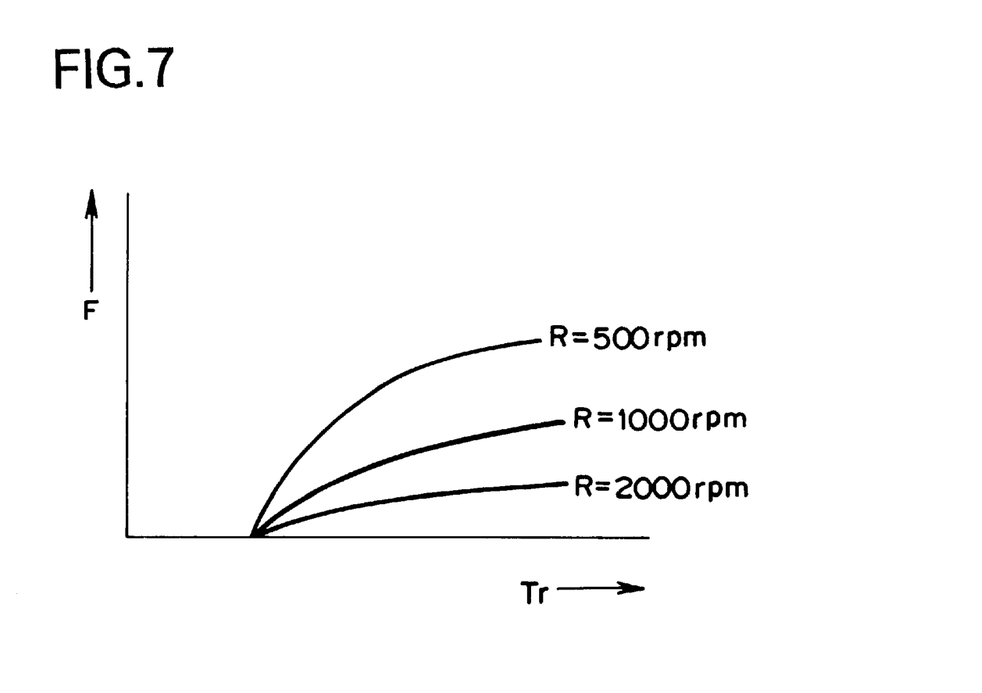
FIG. 7 is a graph showing an example of the characteristic curve used to determine a correction amount from a reference injection period and the rotational speed of a high-pressure pump.

This calculation is carried out by means of map calculation on the basis of map data corresponding to the characteristics shown in FIG. 7. That is, the correction amount F is determined on the basis of the reference injection period Tr and the rotational speed R of the high-pressure pump 2 at each instant. In this case, the correction amount F is calculated as a value to be subtracted from the reference injection period Tr. For the sake of the calculation, the map data corresponding to the characteristics shown in FIG. 7 are stored in advance in a memory 53A provided in the correction amount calculation unit 53, and the correction amount F appropriate for each instant is obtained by map calculation on the basis of the reference injection period data DTr and the rotational speed signal SR. Thus, the correction amount data DF indicating the calculated result is derived from the correction amount calculating unit 53. That is, as explained earlier, since the decrease in fuel pressure during a fuel injection operation becomes less as the rotational speed of the high-pressure pump 2 becomes higher, the map calculation data for calculating a correction amount are determined in such a way that the value of the correction amount data DF becomes smaller as the rotational speed of the high-pressure pump 2 becomes higher.

The correction amount data DF is input to the correcting unit 54 to carry out the calculation of (Tr−F) and the calculated result is determined as the actual injection period Ta. The actual injection period data DTa indicative of the actual injection period Ta is derived from the control unit 5 as an output and is sent to the fuel injection unit 3.

The fuel injection unit 3 is responsive to the actual injection period data DTa sent from the control unit 5 to output a solenoid valve driving pulse DP by which the solenoid valve driving unit 33 is operated so as to achieve the actual injection period Ta, and the solenoid valve 32A is driven in such a way that the injector 32 is opened in response to the solenoid valve driving pulse DP. As a result, the valve-opening period of the injector 32 is controlled with consideration to variation in the fuel pressure in accordance with the rotational speed R of the high-pressure pump 2, and the target fuel injection amount determined by the target fuel injection amount determination unit 51 can be supplied precisely into the cylinders of the internal combustion engine 7.

In addition, since the discharge amount of the high-pressure pump per unit time is proportional to the rotational speed R of the high-pressure pump 2, in order to determine the correction amount F, in FIG. 7, the discharge amount of the high-pressure pump 2 per unit time may be employed instead of the parameter of the rotational speed R.

Furthermore, the total amount of fuel injected to the internal combustion engine 7 per unit time can be calculated from the speed of the internal combustion engine 7 and the amount of fuel injected per one injection, and the rotational speed of the high-pressure pump 2 is determined by the total amount. Consequently, the total amount of fuel injected can be used instead of the rotational speed R.

For determining the correction amount F, it is possible to use characteristics in which the engine speed and the amount of fuel injected per one injection are employed instead of the parameter of the rotational speed R of FIG. 7.

According to the high-pressure fuel injection apparatus 1 constituted as described in the foregoing, the amount of fuel injection can be exactly controlled since the actual injection period of the injector 32 is controlled with consideration to the decrease in fuel pressure occurring when the valve of the injector 32 is opened, whereby the desired operation of the internal combustion engine 7 can be achieved. That is, since the amount of fuel injected is independent of change in the rotational speed of the internal combustion engine 7, the desired torque can be derived therefrom.

Furthermore, according to the configuration of the high-pressure fuel injection apparatus 1, since only the detection of the rotational speed R of the high-pressure pump 2 is required for the precise control, precise control can be realized with little cost increase.

In addition, in the case where the speed of the internal combustion engine 7 and the amount of fuel injected per one fuel injection are employed as parameters for determining the correction amount F, instead of the rotational speed R shown in FIG. 7, the cost is even lower because no detection of the rotational speed R of the high-pressure pump 2 is required.

The control unit 5 shown in FIG. 1 can be constituted, for example, by the use of a microcomputer.

Figure 8:
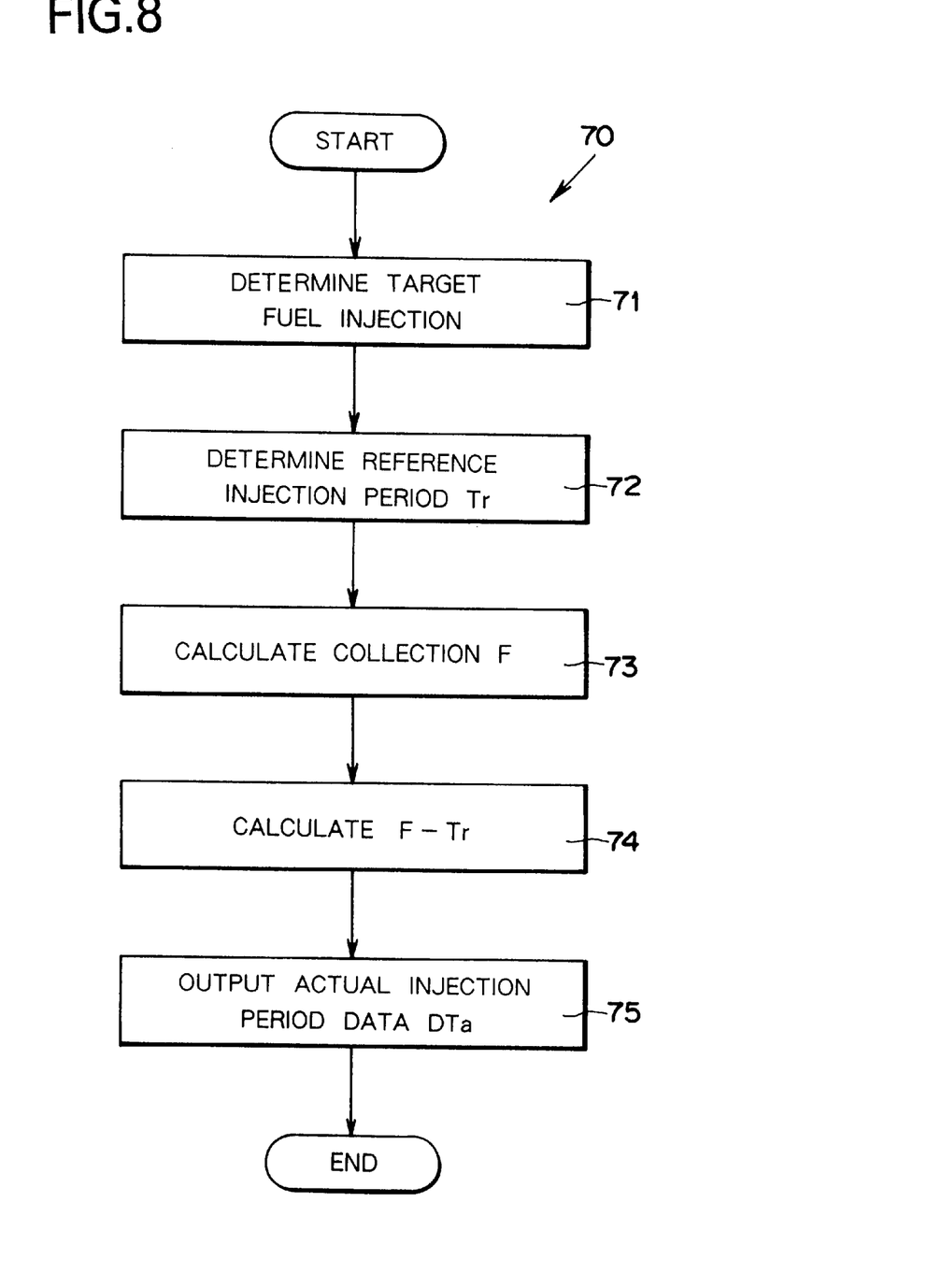
FIG. 8 is a flow chart showing a program for determining an actual injection period, which is used in the case where the control unit shown in FIG. 1 is constituted by use of a microcomputer.

In this case, the actual injection period determination program shown in FIG. 8 is loaded in the microcomputer for execution.

An actual injection period determination program 70 will be now explained with reference to FIG. 8. In step 71, the target amount of fuel injection is determined on the basis of the engine speed signal Ne and the acceleration signal A supplied from the sensor unit 6, and the operation moves to step 72. In step 72, the reference injection period Tr necessary for obtaining the target amount of fuel injection determined in step 71, is determined. The process in step 72 corresponds to the determination process achieved by the reference injection period determining unit 52.

In step 73, the correction amount F is calculated from the reference injection period Tr determined in step 72 and the rotational speed signal SR from the rotational speed detecting unit 4. This calculation is carried out by means of map calculation based on map data corresponding to the characteristic curve shown in FIG. 7. The process carried out in step 73 corresponds to the correction calculation process carried out in the correction amount calculating unit 53.

In step 74, the correction calculation is carried out, i.e., the correction amount F obtained in step 73 is subtracted from the reference injection period Tr obtained in step 72. In step 75, the actual injection period data DTa for driving the injector 32 to obtain the actual injection period based on the result of the correction calculation obtained in step 74 is output.

INDUSTRIAL APPLICABILITY

As stated above, the high-pressure fuel injection method and apparatus of the present invention are useful for accurately controlling the amount of fuel injected regardless of decrease in fuel pressure caused by fuel injection.

What is claimed is:

1. A high-pressure fuel injection apparatus comprising:
   a high-pressure pump for pressurizing fuel to supply high-pressure fuel;
   a fuel injection section having a common rail for accumulating the high-pressure fuel therein and an injector (s) for supplying and injecting the high-pressure fuel accumulated in the common rail to an internal combustion engine; and
   a control section for controlling an actual injection period of the injector(s);

said control section comprising:
- a first determining means responsive to at least one signal indicative of the operation condition of the internal combustion engine for determining a target amount of fuel injection per one period of fuel injection;
- a second determining means for determining a reference injection period of the injector in correspondence to the target amount of fuel injection determined by the first determining means;
- a calculating means responsive to the reference injection period and the rotational speed of the high-pressure pump for calculating a correction value for correcting the reference injection period so as to correct an error caused by the decrease in fuel pressure during the period of fuel injection; and
- a correcting means for correcting the reference injection period by the correction value, whereby the actual injection period is controlled in response to the output from the correcting means.

2. A high-pressure fuel injection apparatus as claimed in claim 1, wherein said calculating means is arranged so that said correction value decreases as the rotational speed of said high-pressure pump becomes higher.

3. A high-pressure fuel injection apparatus as claimed in claim 2, wherein said calculating means calculates the correction value by map calculation on the basis of map calculation data corresponding to a relationship between the reference injection period and the correction value using the rotational speed of said high-pressure pump as a parameter.

4. A high-pressure fuel injection apparatus as claimed in claim 1, wherein said calculating means calculates the correction value in response to an amount of fuel discharged from said high-pressure pump per unit time instead of the rotational speed of said high-pressure pump.

5. A high-pressure fuel injection apparatus as claimed in claim 1, wherein said calculating means calculates the correction value in response to a total amount of fuel injected to said internal combustion engine per unit time instead of the rotational speed of said high-pressure pump.

6. A high-pressure fuel injection apparatus as claimed in claim 5, wherein the total amount of fuel injected is calculated from the rotational speed of said internal combustion engine and the amount of fuel injected per one time.

7. A method for injecting high-pressure fuel, in which high-pressure fuel pressurized by means of a high-pressure pump is accumulated in a common rail and the high-pressure fuel accumulated in the common rail is injected directly into a cylinder of an internal combustion engine by open/close controlling a solenoid valve of an associated injector, said method comprising:
- a first determining step for determining a target amount of fuel injection per one period of fuel injection, the target amount being matched to the operation condition of the internal combustion engine;
- a second determining step for determining a reference injection period indicating a valve-open-period of said solenoid valve for achieving the target amount of fuel injection;
- a calculating step for calculating a correction value for correcting the reference injection period so as to correct an error caused by decrease in fuel pressure during the period of fuel injection in response to the reference injection period and the rotational speed of the high-pressure pump; and
- a step for correcting the reference injection period by the correction value to obtain an actual injection period during which the solenoid valve should be opened, whereby the solenoid valve is open/close controlled to open the solenoid valve for the actual injection time.

8. A method as claimed in claim 7, wherein said correction value calculated in said calculating step decreases as the rotational speed of said high-pressure pump becomes higher.

9. A method as claimed in claim 8, wherein said correction value calculated in said calculating step is calculated on the basis of map calculation data corresponding to a relationship between the reference injection period and the correction value using the rotational speed of said high-pressure pump as a parameter.

* * * * *